(12) United States Patent
Jacob (10) Patent No.: US 7,409,440 B1
(45) Date of Patent: Aug. 5, 2008

(54) USER DEFINED DATA ITEMS

(75) Inventor: Arun T. Jacob, Seattle, WA (US)

(73) Assignee: F5 Net works, Inc., Seattle, WA (US)

( * ) Notice: Subject to any disclaimer, the term of this patent is extended or adjusted under 35 U.S.C. 154(b) by 545 days.

(21) Appl. No.: 10/318,662

(22) Filed: Dec. 12, 2002

(51) Int. Cl.
  *G06F 15/173* (2006.01)
(52) U.S. Cl. .................................. 709/223; 709/224
(58) Field of Classification Search ................ 703/223, 703/224
  See application file for complete search history.

(56) References Cited

U.S. PATENT DOCUMENTS

| | | | |
|---|---|---|---|
| 6,363,056 B1 * | 3/2002 | Beigi et al. ................ 370/252 |
| 6,970,924 B1 * | 11/2005 | Chu et al. .................... 709/224 |
| 6,973,490 B1 * | 12/2005 | Robertson et al. ........... 709/224 |
| 6,990,074 B2 * | 1/2006 | Wan et al. .................... 370/235 |
| 7,003,564 B2 * | 2/2006 | Greuel et al. ............... 709/224 |
| 7,065,482 B2 * | 6/2006 | Shorey et al. ............... 709/224 |
| 2002/0174216 A1 * | 11/2002 | Shorey et al. ............... 709/224 |
| 2003/0018450 A1 * | 1/2003 | Carley ......................... 702/179 |
| 2003/0236995 A1 * | 12/2003 | Fretwell, Jr. ................ 713/200 |
| 2004/0138858 A1 * | 7/2004 | Carley ........................ 702/186 |

* cited by examiner

Primary Examiner—Nathan J. Flynn
Assistant Examiner—Mohamed Wasel
(74) Attorney, Agent, or Firm—Nixon Peabody LLP (57) ABSTRACT

A method and system for processing user defined operations on collected network data is provided. Monitors collect data from network devices and store the collected data in a database. The monitors collect data relating to the user defined operation. After the data is collected, the user defined operation is performed on the collected data. The user may then view the result.

19 Claims, 7 Drawing Sheets

USER DEFINED DATA ITEMS

FIELD OF THE INVENTION

The present invention relates to data collection over a network, and more particularly to operating on the data in a user defined manner and providing the result.

BACKGROUND

There are a number of different applications that allow a user to collect, view, and use data from network devices and applications. This data may be used for many different purposes. For example, the data may be used to enforce policy decisions regarding network traffic and the like. The data received by the user is predefined by the application and/or device providing the data. This data may then be manipulated by a device or program external to the network device or program. These programs may allow the user to make certain decisions, but not others.

As E-commerce among business-to-business and consumer applications continues to expand, companies require precise monitoring tools, along with a forecasting mechanism to assist in capacity planning. Network management tools can help a user spot potential problems before they occur, then visualize the future steps needed to keep E-commerce sites performing as they should.

Some networking tools provide administration, monitoring and trended analysis for Internet traffic management based on various metrics. The networking tools help to allow businesses, to monitor server traffic, while providing forecasting tools to assist in traffic analysis and network planning. System administrators can perform capacity planning exercises to forecast when their infrastructure will require upgrades. Additionally, some of the networking tools monitor current performance, as well as provide an analysis package to review past operations, and help predict future functionality. For an E-commerce site, these networking tools may help administrators decide when and how to upgrade their infrastructure to meet increasing user demand, so that a potential customer need never be turned away because the site couldn't handle the traffic.

The continued growth of E-commerce applications presents challenges to both business and IT managers. E-commerce applications are not only growing at a phenomenal pace, they are becoming more strategic to an organizations' operation. Inadequate server capacity, scalability, persistence, and fault-tolerant reliability may cause problems for many companies. Overcoming these problems helps to avoid the costs associated with an unreachable site.

SUMMARY

The present invention is directed at providing a method and system for collecting data related to a network, performing user defined operations on the collected data to produce a result, and providing the result.

According to one aspect of the invention, a user defines an operation that is applied to a set of data points. Instead of measuring separate items with respect to time, the data may be combined and viewed in a way that is user defined.

According to another aspect of the invention, monitors collect data relating to a network and store the collected data in a database. The monitors may collect the data at a predetermined frequency, on the occurrence of an event, or some other condition.

According to yet another aspect of the invention, a set of operations is provided to the user that may be applied to the collected data that is stored. The operations may be applied to a data point or a group of data points.

According to still yet another aspect of the invention, an operation parser applies the user defined operation to the data. The operation parser may apply the user defined operation to the data at a predetermined rate, time, or on the occurrence of a monitored event.

According to a further aspect of the invention, the user defined operation is serialized as an XML stream that conforms to an XML schema.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "network device" refers to a network element, such as a router, that collects data relating to a network. The term "user" refers to any person or customer such as a business or organization that collects data relating to the performance of a network. Referring to the drawings, like numbers indicate like parts throughout the views. Additionally, a reference to the singular includes a reference to the plural unless otherwise stated or is inconsistent with the disclosure herein.

In the following description, first an illustrative operating environment in which the invention may be practiced is disclosed. Then, an exemplary user defined data items system is described. Next, a method is described for a user defined data operations process.

Illustrative Operating Environment

Figure 1:
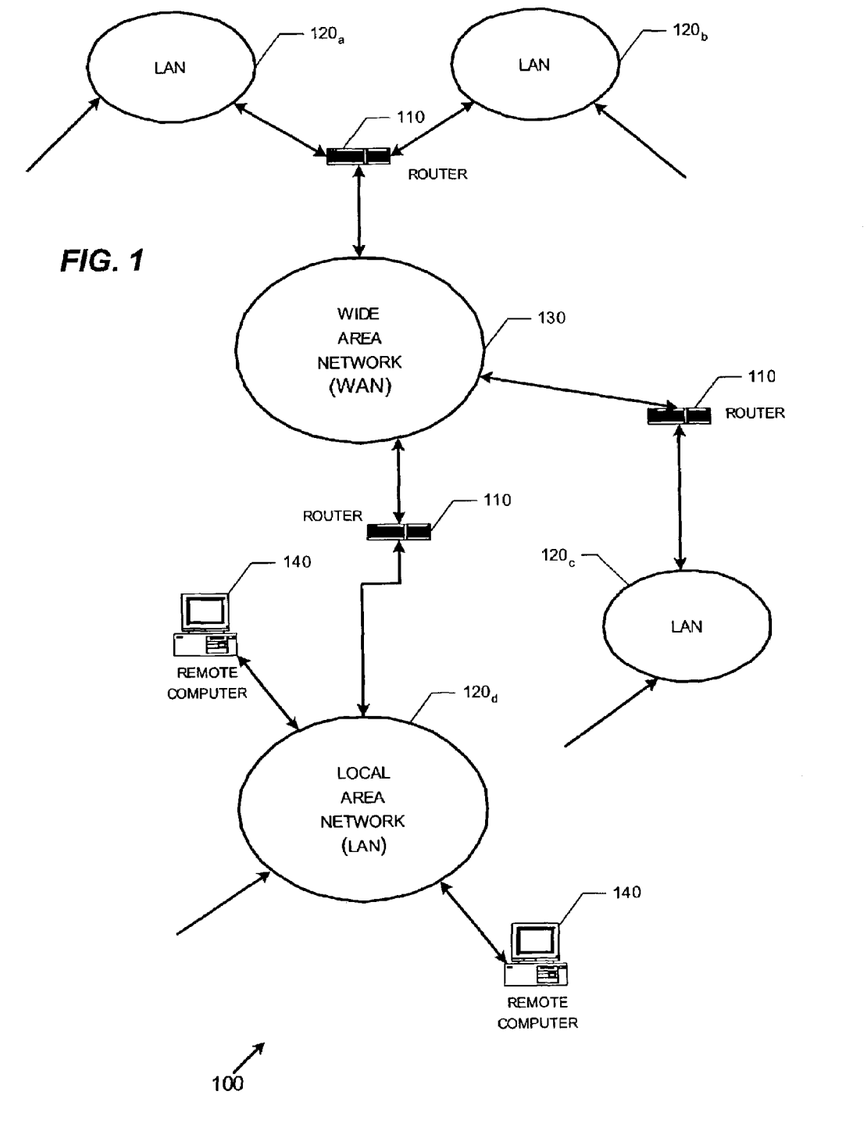
FIGS. 1-3 show components of an exemplary environment in which the invention may be practiced.
Figure 2:
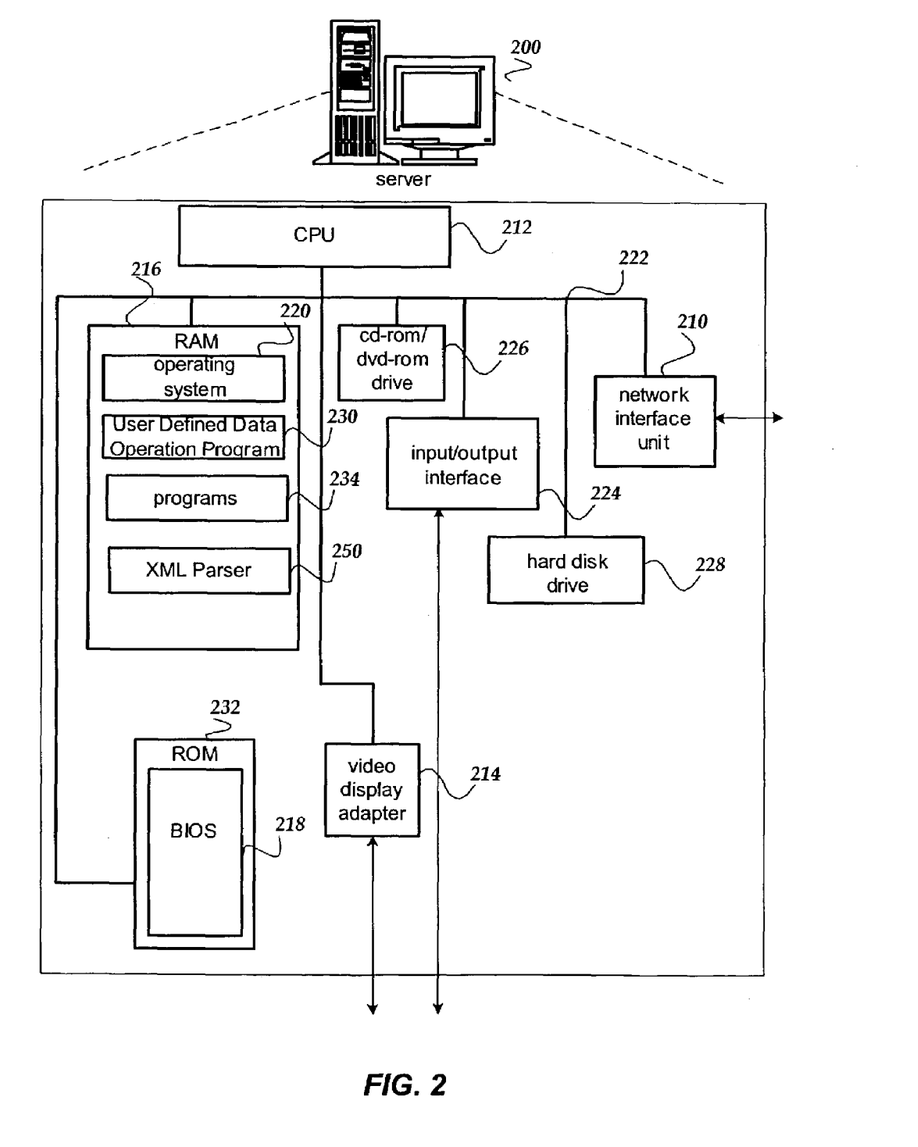
Figure 3:
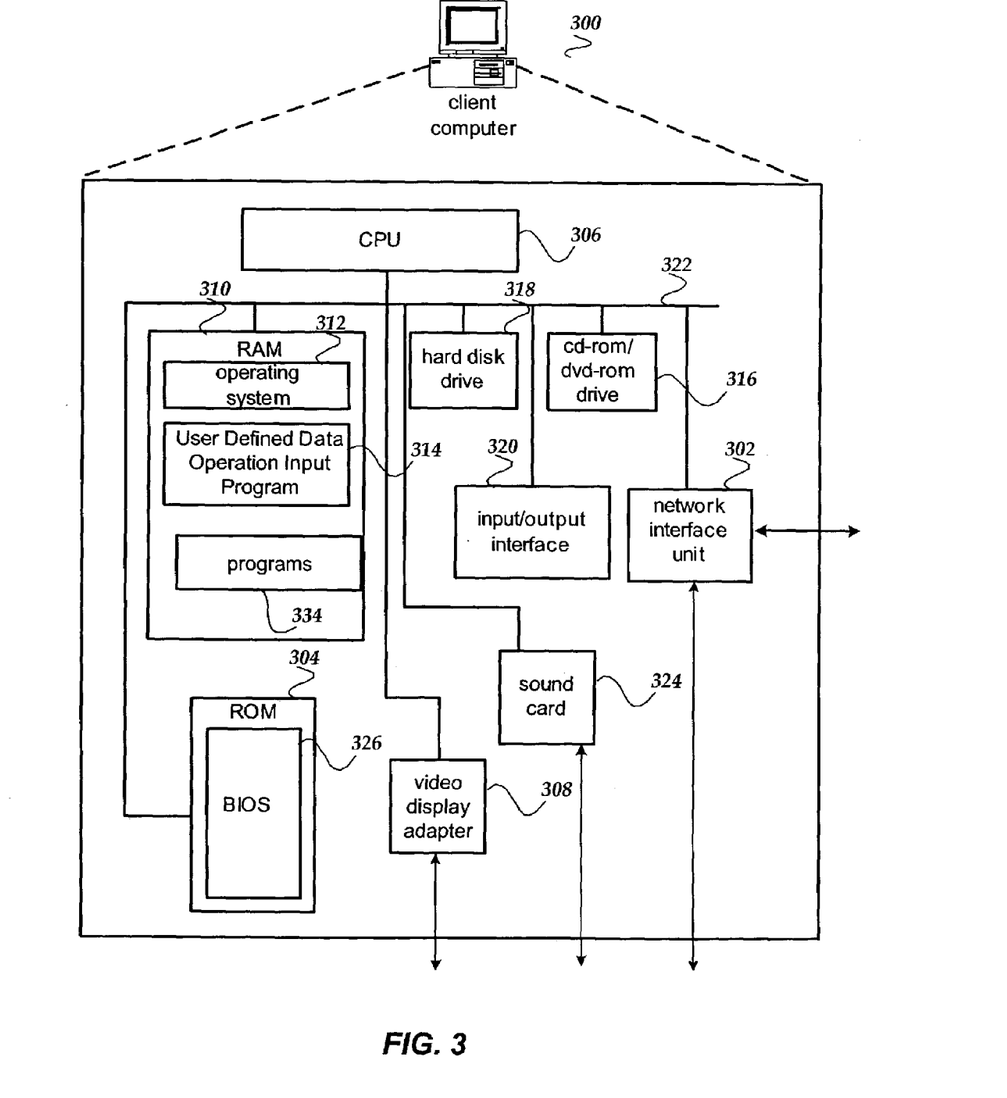

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") $120_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs $120_{a-d}$ or WAN 130 via a modem and temporary telephone link. The number of WANs, LANs, and routers in FIG. 1 may be increased or decreased arbitrarily without departing from the spirit or scope of this invention.

As such, the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational and other computer systems, that route data and messages. An embodiment of the invention may be practiced over the Internet.

The media used to transmit information in communication links as described above illustrates one type of computer-readable media, namely communication media. Generally, computer-readable media includes any media that can be accessed by a computing device. Computer-readable media may include computer storage media, communication media, or any combination thereof. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

A server, such as the server described in more detail in conjunction with FIG. 2, is a computer connected to the Internet that having storage facilities for running administrative software for handling data requests. A server may also include facilities for storing and transmitting application programs, such as application programs written in the JAVA programming language from Sun Microsystems, for execution on a remote computer. Likewise, a server may also include facilities for executing scripts and other application programs on the server itself.

FIG. 2 shows an exemplary server that may operate to perform a user defined operation on collected network data, among other things. Server 200 may transmit data to other network devices, as well as receive data from network devices. The data flows may take place over the Internet, WAN/LAN 100, or some other communications network.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. This component may comprise a general purpose server operating system, such as UNIX, LINUX™, Microsoft WINDOWS NT@, or some other operating system. Basic input/output system ("BIOS") 218 is also provided for controlling the low-level operation of server 200.

Server 200 may be implemented as a blade server. A blade is a card inserted into a hardware chassis. A blade may include, for example, one or more processors, volatile and non-volatile memory, interfaces suitable for transferring information to and from the blade, and the like. For example, a blade may include a specialized interface for transferring information to a backplane and other interfaces, such as a USB port, serial port, RF interface, IR interface, and IDE controller for transferring information to other devices.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for performing a user defined data operation on data collected from network devices. More specifically, the mass memory may store applications including User Defined Data Operation (UDDO) program 230, and programs 234. UDDO program 230 includes computer executable instructions which, when executed by server 200, perform user defined data operations on data collected from network devices. According to one embodiment of the invention, the user defined data operation may be implemented as an XML stream that conforms to a predefined XML schema. Server 200 includes XML parser 250 to act on the XML stream.

Server 200 may also comprise input/output interface 224 for communicating with external devices, such as a mouse, keyboard, scanner, or other input devices not shown in FIG. 2.

Likewise, server 200 may further comprise additional mass storage facilities such as optical drive 226 and hard disk drive 228. Hard disk drive 228 is utilized by server 200 to store, among other things, application programs, databases, and program data used by UDDO program 230. For example, collected network data, customer databases, product databases, image databases, and relational databases may be stored.

FIG. 3 depicts several components of client computer 300. Client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304 and a permanent mass storage device, such as a disk drive. The memory stores operating system 312, User Defined Data Operations (UDDO) input program 314, and programs 334 for controlling the operation of client computer 300. The memory may also include a WWW browser, such as Netscape's NAVIGATOR® or Microsoft's INTERNET EXPLORER® browsers, for accessing the WW. These components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. UDDO input program 314 may be executed by the client computer to define a user defined data operation. Briefly described, the user defined data operation is an operation defined by the user that is performed on data collected from network devices collected to a network, such as the network illustrated in FIG. 1.

Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on routers 110, on server 200, on client computer 300, or on some combination of the above. For example, programming steps may be contained in programs 230, 234, 314, and 334.

Illustrative User Defined Data Operations (UDDO) System

UDDO system provides the means for network management/Internet policy enforcement. This functionality can help to deliver precise monitoring of Internet traffic, along with forecasting mechanisms to assist in capacity planning. Data is presented to the user in a format that meets their requirements. Policies can be set based on server traffic, server status, number of connections, active/inactive IP addresses, and the like. For example, through the UDDO system, users can view a single data point that relates to many data points collected from network devices. By defining user defined operations on collected network data, users can also proactively tune variables to determine the impact of running new network applications, predict the result of increased user capacity, and set policies accordingly.

Figure 4:
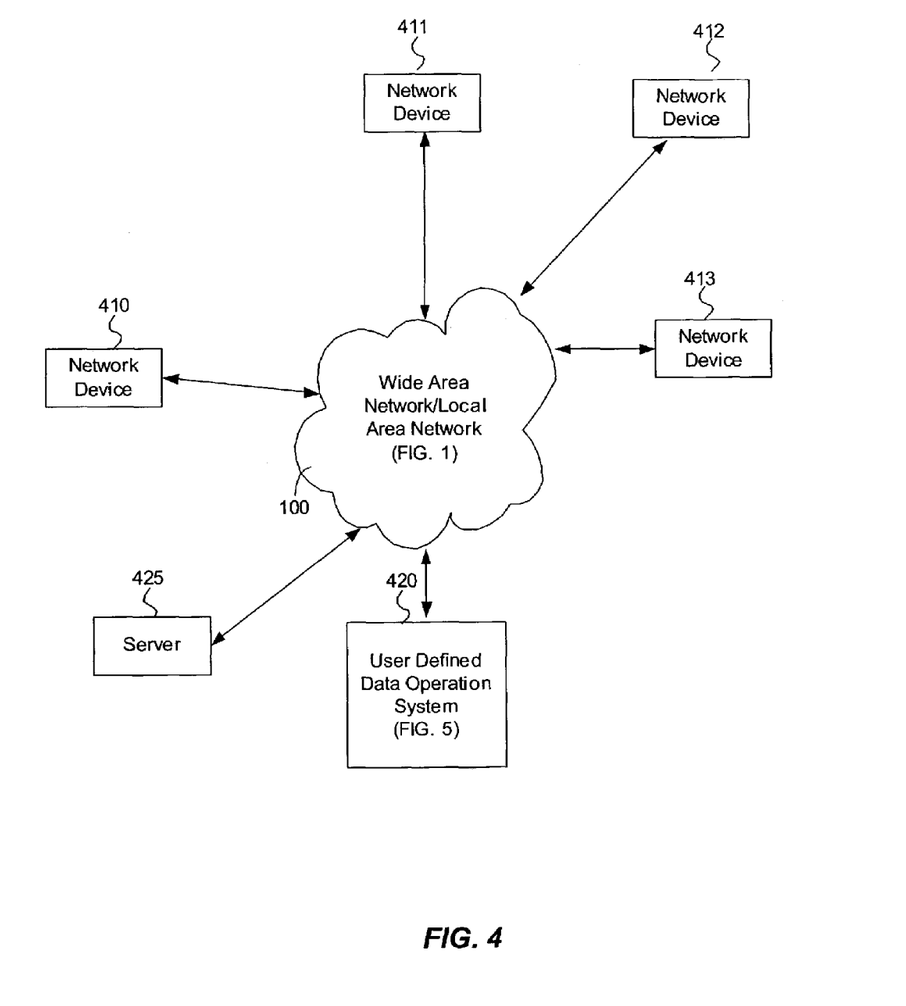
FIG. 4 illustrates an exemplary environment in which the invention operates in which a User Defined Data Operation System is connected to a network.

FIG. 4 illustrates an exemplary environment in which the invention may operate in which a User Defined Data Operation (UDDO) system is connected to a data network. The environment includes network devices 410-413, server 425, WAN/LAN 100, and UDDO System 420.

Network devices 410-413 are any devices capable of connecting with WAN/LAN 100. Such devices include devices that typically connect to WAN/LAN using a wired communications medium. Such devices may also include devices that typically connect using a wireless communications medium. Some exemplary network devices that may connect with WAN/LAN 100 are the BIG-IP, 3-DNS, and EDGE-FX devices from F5 Networks, Incorporated of Seattle, Wash.

Server 425 receives, among other things, requests for content. Content includes information that may be found on one or more WWW servers such as Web pages, documents, files, databases, FTP data, or other information. After receiving a request for content, server 425 may forward the request in some situations. Server 425 may determine where to forward the request to using many factors including where the request originates from, what the request is requesting, load on servers in a virtual server array, and/or other factors. Requests for content may come from a device coupled to WAN/LAN 100, a server in virtual server array, a cache, or some other requester.

UDDO system 420 is coupled to the network and may monitor network devices. UDDO system 420 and its interaction with collection, monitoring, and processing of network information is described in more detail in conjunction below. Briefly, UDDO 420 allows a user to apply an arithmetic operation that they have defined on a collection of data points relating to the network. Instead of mapping separate items with respect to time, the collected data points may be combined and viewed in a single metric that is configured according to the user's specifications. In other words, the data may be combined from many different network devices that are monitored and processed according to a user defined data operation, or set of operations.

UDDO system may be implemented using one or more personal computers, POCKET PCs, blades, components of a blade, wearable computers, processors, multiprocessor systems, microprocessor-based or programmable consumer electronics, network PCs, cell phones, smart phones, pagers, walkie talkies, radio frequency (RF) devices, infrared (IR) devices, CBs, integrated systems or devices combining one or more of the preceding devices, and the like. For example, UDDO system may be implemented as multiple blades, as a server that includes a blade and other components, or the like. Components implementing a UDDO system may be implemented solely in hardware or in hardware and software. For example, such devices may include some application specific integrated circuits (ASICs) coupled to one or more microprocessors.

Figure 5:
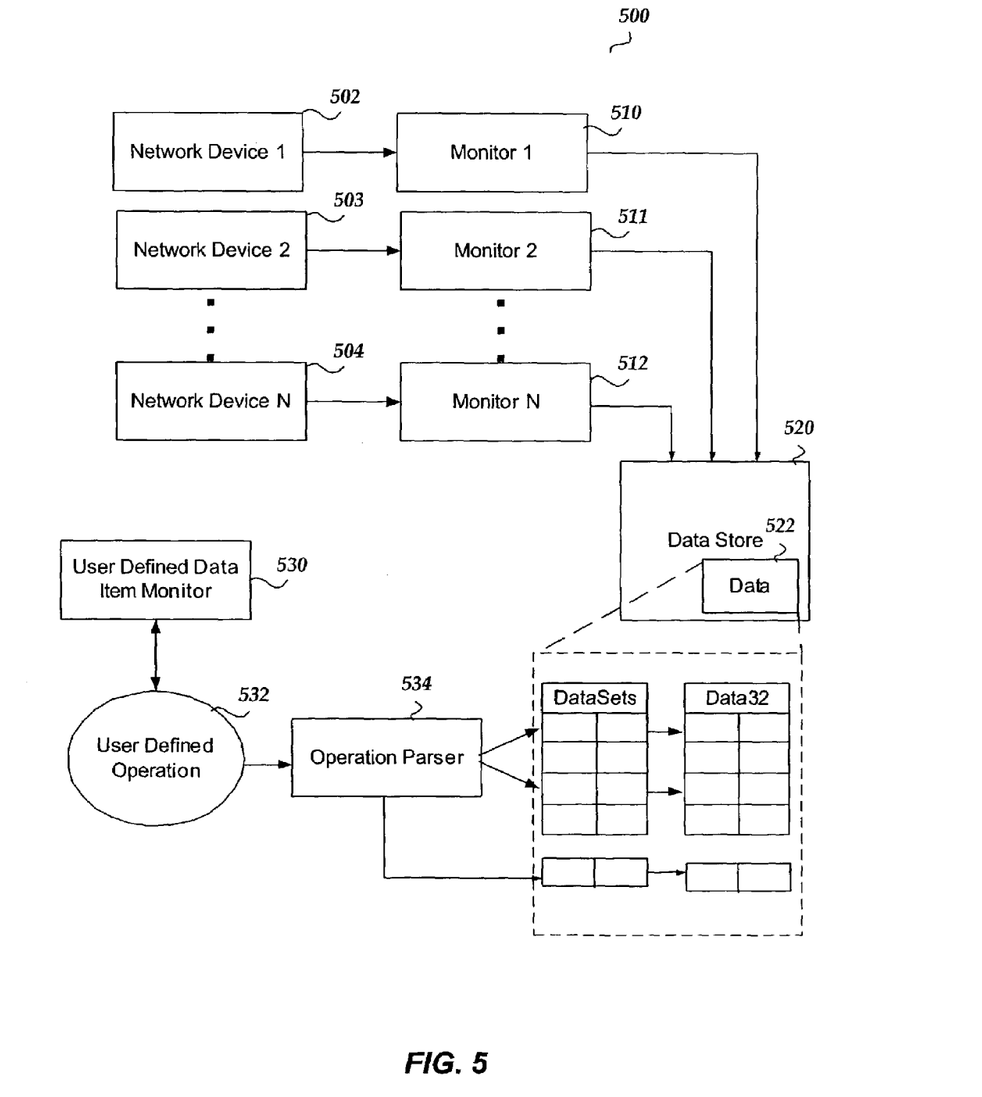
FIG. 5 shows a schematic diagram of a User Defined Data Operation System.

FIG. 5 shows a schematic diagram of a user defined data operation (UDDO) system, in accordance with aspects of the invention. As shown in the figure, user defined data operation system 500 includes network devices 1-N (502-504), monitors 1-N (510-512), data store 520, user defined data item monitor 530, user defined operation (UDO) 532, operation parser 534, and data 522.

UDDO system 500 is connected as followed. Network devices 1-N are coupled to a network, such as the network illustrated in FIG. 1. Monitors 1-N have an input coupled to network devices 1-N, respectively. Monitors 1-N also include an output coupled to data store 520. Data store 520 includes an input coupled to monitors 1-N. Operation parser 534 is coupled to user defined operation 532 and is also coupled to data 522. User defined operation 532 is coupled to user defined data item monitor 530.

The operation of UDDO system 500 will now be described. Network devices 1-N are monitored by monitors 1-N according to predefined parameters. The predefined parameters may be chosen and set by the user or they may be automatically determined based on a desired operation. For example, the monitors may collect the network traffic data, throughput data, and other data related to a network at predetermined rates. Generally, network devices 1-N are configured to provide predetermined network data about various network parameters to which they are coupled and may not be set by the user. Monitors 1-N are configured to monitor the corresponding network device for the information defined by the user to be monitored. For example, each monitor may collect the default network information output by the respective network device. Each monitor stores the collected information in data store 522. According to one embodiment, each monitor is implemented asynchronously. User defined data item monitor 530 may then perform the user defined operation on the collected information.

The user may perform a user defined operation on the collected data. The user defined operation may be any type of operation performed on data. According to one embodiment, the user defined operation may include addition, subtraction, multiplication, and division operations. The operations may be performed on single data points, or sets of data points from the collected information. Many different operations may be performed. For example, a common data point across a group of similar network devices may be summed (e.g. bits out for all virtual servers in the system). Alternatively, data from different network devices may be operated on utilizing a user defined operation. The user defined operation 532 is performed by operation parser 534 and the processed network information is stored in the database. According to the above example, a single point showing the bits out for all of the virtual servers in the system will be delivered to the user instead of a collection of single points. According to one embodiment, the user defined operations are serialized as an XML stream. XML is advantageous in that it can be accessed in a language independent manner, for operation, parsing, and display. XML tags may be customized and referenced by Java Tag Libraries, or be accessed by C++ code that uses an XML parser.

Default user defined operations may be included within the UDDO system. The default user defined operations may be included in scripts and perform operations like aggregation of bits in/out values across network devices.

Illustrative Method for User Defined Data Items

Figure 6:
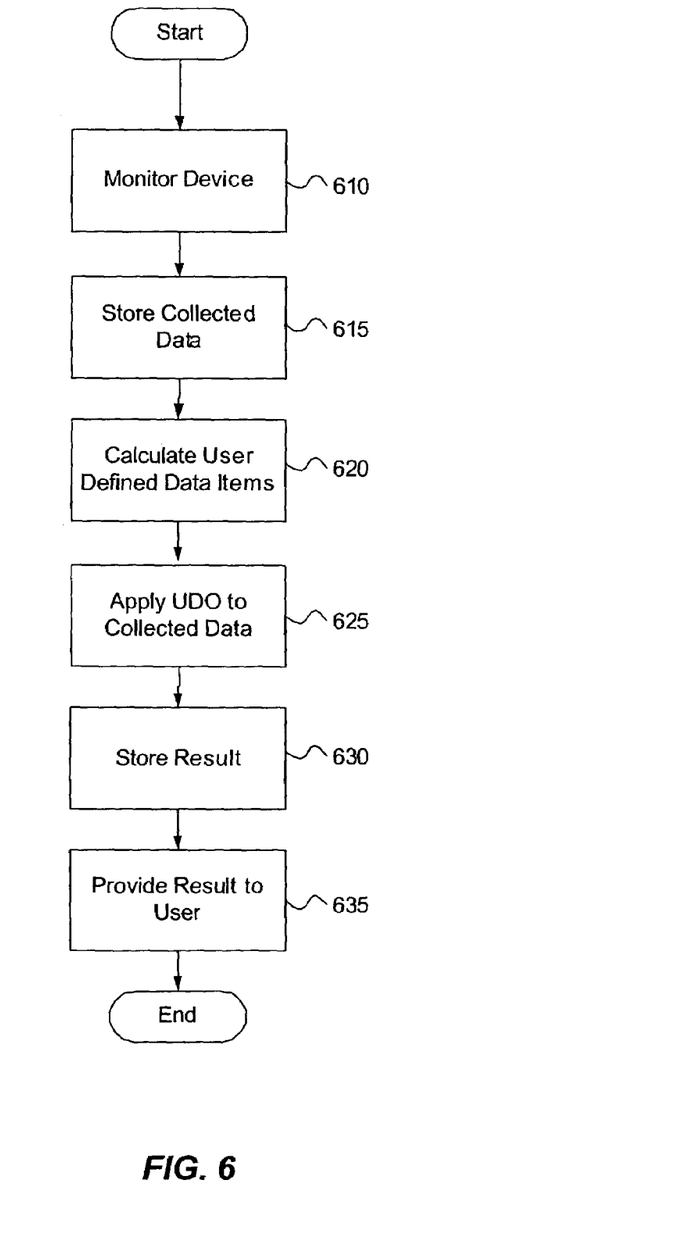
FIG. 6 illustrates a process for applying a user defined operation to network data.

FIG. 6 illustrates a process for collecting, viewing, and using the user defined data items, in accordance with aspects of the invention. After a start block, the process moves to block 610, at which point the monitor collects data from the network device. Moving to block 615, data that matches the user's defined data items is stored. For example, when a user defined operation is calculating the number of bits in to a group of network devices, the monitor will monitor the data relating to bits in for the network device. This data may be stored in many different manners. For example, the data may be stored in a database or some other data store. Transitioning to block 620, the user defined data items are calculated. This calculation happens asynchronously with respect to the data collection of its user defined data components. According to one embodiment of the invention, the user defined data items comprise information from the data store. When the data is not in the data store, the operation fails. Alternatively, one or more components of the set of user defined data items may be collected directly from the monitor associated with the network device. Next, at block 625, the user defined operation (UDO) is applied to the collected data. According to one embodiment of the invention, the User Defined Operation is implemented as an XML stream that conforms to an XML Schema. The UDO is applied to the most recent stored data. Moving to block 630, the result of the UDO is stored for later use. Transitioning to block 635, the result is provided to the user. The result may be formatted according to the user's specifications. The process then steps to an end block and returns to processing other actions.

Figure 7:
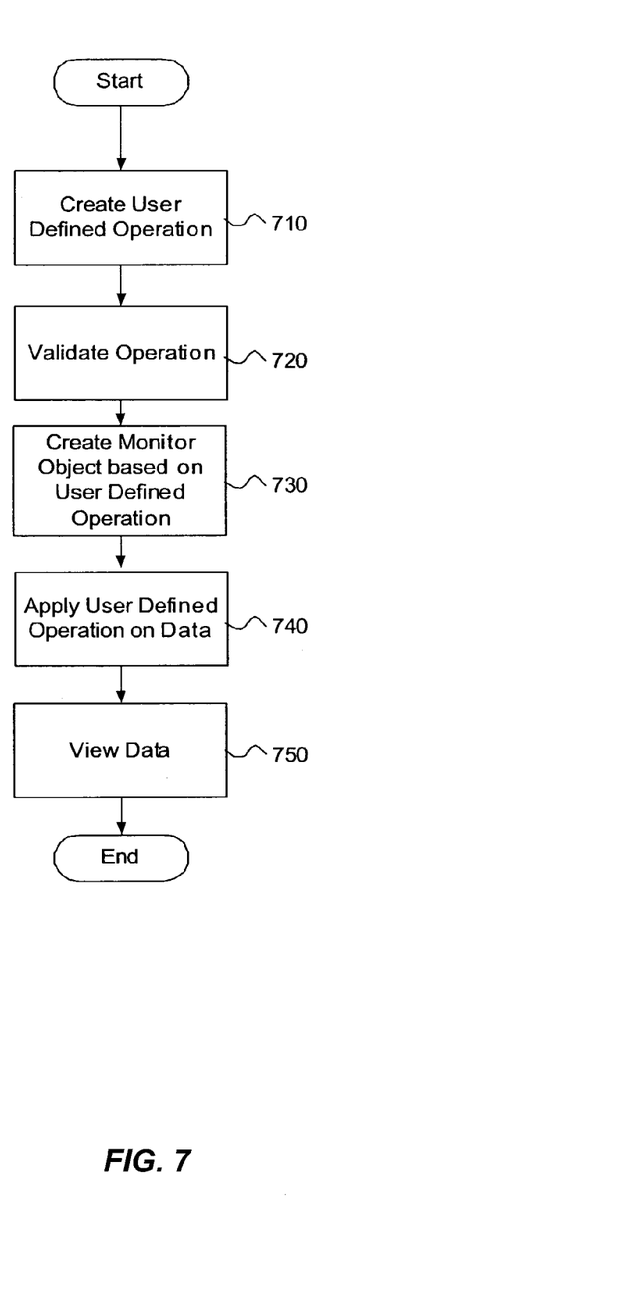
FIG. 7 illustrates a process for a user to create and apply a user defined operation, in accordance with aspects of the invention.

FIG. 7 shows a process for a user creating a user defined operation, applying the UDO, and viewing the results. After a start block, the process moves to block 710, at which point the user creates a user defined operation. The user may define many operations. According to one embodiment of the invention, the user may choose between an addition operation, subtraction operation, multiplication operation, and division operation. The user can also group basic arithmetic operations, explicitly determining the order of those operations. The user may further refine the operation to be performed on single data points, sets of data points, real numbers, and the like. According to one embodiment of the invention, the user defined operation is serialized as an XML stream. Moving to block 720, the UDO operation is validated to ensure that the operation is valid and may be performed on the data. Transitioning to block 730, a monitor object based on the UDO is created to monitor the network device. The monitor object is created such that it monitors the network device for the data relevant to the UDO. Stepping to block 740, the UDO is applied to the monitored data. Next, at block 750, the user may view the data resulting from the application of the UDO to the collected data. The process then steps to an end block and returns to processing other actions.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. The functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for applying a user defined operation (UDO) on data relating to a network, comprising:
   monitoring network data including a plurality of common data points, each of the common data points generated by each of a plurality of network devices and representing a common network parameter;
   collecting the network data in a data store;
   allowing a user to create the definition of the UDO by providing the user with a list of operations that the user can choose to apply to the network data to produce a result;
   receiving the definition of the UDO, the definition including at least one operation applicable to the plurality of common data points to yield a result predicting an impact of making a change to the network, wherein the UDO is implemented as an XML stream that conforms to an XML schema;
applying the UDO to the collected network data;
producing a result from applying the UDO; and
storing the result of the UDO in the data store for subsequent analysis.

2. The method of claim 1, wherein monitoring the network device for data relating to the UDO further comprises monitoring the plurality of network devices at one of:
a predetermined frequency; and
upon occurrence of an event.

3. The method of claim 1, wherein the UDO may be applied to at least one of a data point and a group of data points.

4. The method of claim 1, wherein producing the result further comprises formatting the result according to a user's specifications.

5. The method of claim 1, wherein defining the UDO, further comprises determining an order to apply operations within the UDO.

6. A system for operating on data relating to a network in a user defined manner, comprising;
a network device configured to provide network data;
a monitor device configured to collect data from the network device according to predefined parameters;
a user defined operation (UDO), the UDO defining one or more operations to be applied to the collected data to yield a result predicting an impact of making a change to the network, wherein the UDO is implemented as an XML stream that conforms to an XML schema;
a UDO creator, the UDO creator being configured to allow a user to create the definition of the UDO by providing the user with a list of operations that the user can choose to apply to the network data to produce a result;
an operation parser configured to access the collected data, apply the UDO to the data, and produce the result; and
a user defined data item monitor device configured to provide the user with the result according to a user specification.

7. The system of claim 6, further comprising a data store configured to store the collected data.

8. The system of claim 6, wherein the UDO includes at least one arithmetic operation including:
an addition operation;
a subtraction operation;
a multiplication operation; and
a division operation.

9. A computer readable storage medium for storing computer-executable instructions for operating on network data in a user defined manner, comprising:
allowing the user to create a definition of a user defined operation (UDO) by providing the user with a list of operations that the user can choose to apply to the network data to produce a result;
receiving the definition of the UDO, the UDO defining one or more operations to be applied to selected items of the network data to yield the result predicting an impact of making a change to the network, wherein the UDO is implemented as an XML stream that conforms to an XML schema;
monitoring a network device for the network data relating to the UDO;
collecting the data relating to the UDO from the network device in a data store;
applying the UDO to the collected network data; producing the result from applying the UDO; and
storing the result.

10. The computer readable storage medium of claim 9, wherein monitoring the network device for data relating to the UDO further comprises monitoring the network device at one of at least:
a predetermined frequency; and
on occurrence of an event.

11. The method of claim 1, further comprising validating the definition of the UDO to ensure that at least one of:
the operation is valid; and
the operation is performable on the data.

12. The method of claim 1, wherein the result of the UDO is stored in the data store where the collected data is stored.

13. The method of claim 12, wherein the result predicting the impact of making a change to the network includes predicting the impact on the network of adding one of:
an additional network application; and
increased user capacity.

14. The system of claim 6, further comprising a UDO validator configured to ensure that at least one of:
the operation is valid; and
the operation is performable on the collected data.

15. The system of claim 6, wherein the result predicting the impact of making a change to the network includes predicting the impact on the network of adding one of:
an additional network application; and
increased user capacity.

16. The system of claim 7, wherein the data store is further configured to store the result.

17. A method, comprising:
monitoring network data generated by each of a plurality of network devices, the plurality of network devices generating one or more data points, wherein at least one of the data points includes a common network parameter generated by each of the plurality of network devices;
collecting the network data in a data store;
allowing a user to define a user defined operation (UDO), including:
choosing from among the one or more data points generated by the plurality of network devices to be included in the UDO;
providing the user with a list of arithmetic operations that the user can choose to apply to the one or more data points chosen by the user in a chosen order to produce a combined result representing the one or more data points chosen by the user;
receiving the UDO defined by the user;
implementing the UDO as an extensible markup language (XML) stream, the XML stream conforming to an XML schema;
transmitting the XML stream representing the UDO to an operation parser configured to access the network data in the data store and apply the UDO to the one or more data points included in the UDO;
applying the UDO to the one or more data points included in the UDO;
producing a result from applying the UDO, and
storing the result of the UDO for subsequent analysis.

18. The method of claim 17, wherein collecting the network data in the data store further comprises providing the user with options for collecting the network data including:
an option for collecting the network data at a predetermined frequency; and
an option for collecting the network data upon occurrence of an event.

19. The method of claim 17, further comprising a UDO validator configured to ensure that at least one of:
the operation is valid; and
the operation is performable on the collected data.

* * * * *